Dec. 22, 1970  G. V. WOODLING  3,549,282
FLUID PRESSURE DEVICE HAVING PLURALITY OF SETS
OF STATOR-ROTOR MECHANISMS
Filed Feb. 18, 1969  2 Sheets-Sheet 1

INVENTOR
GEORGE V. WOODLING
BY
Woodling, Krost, Granger and Rust
attys

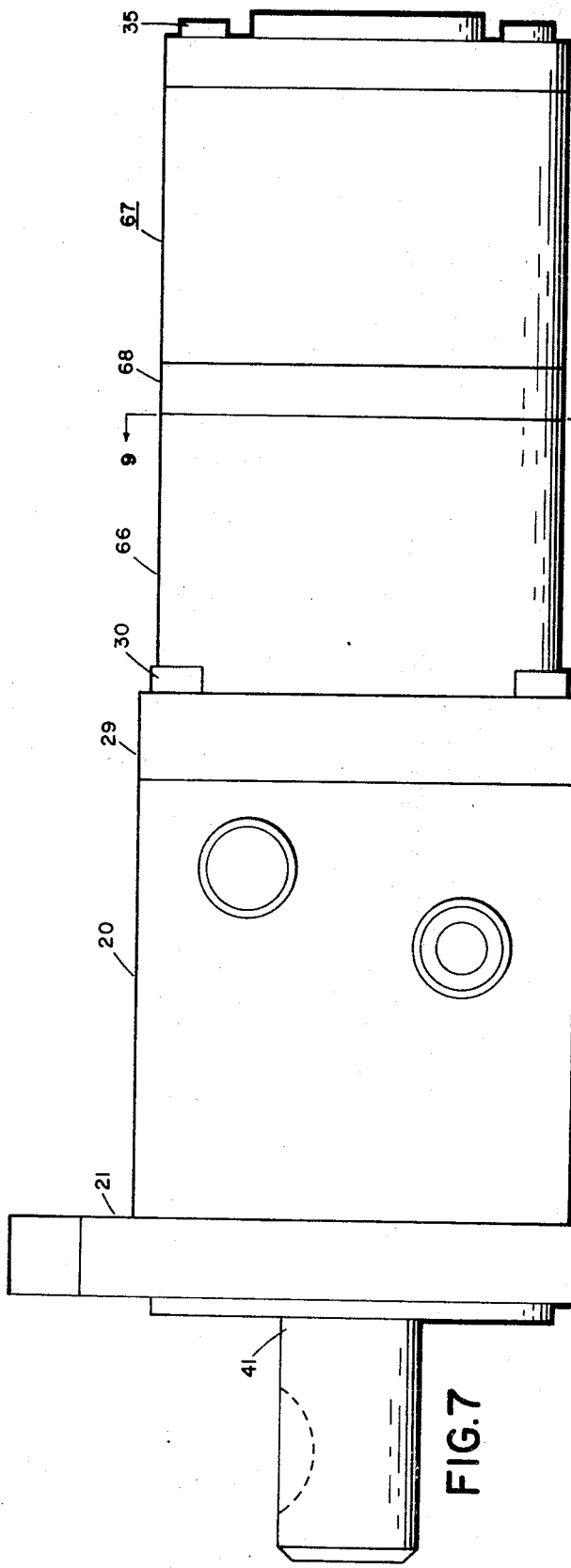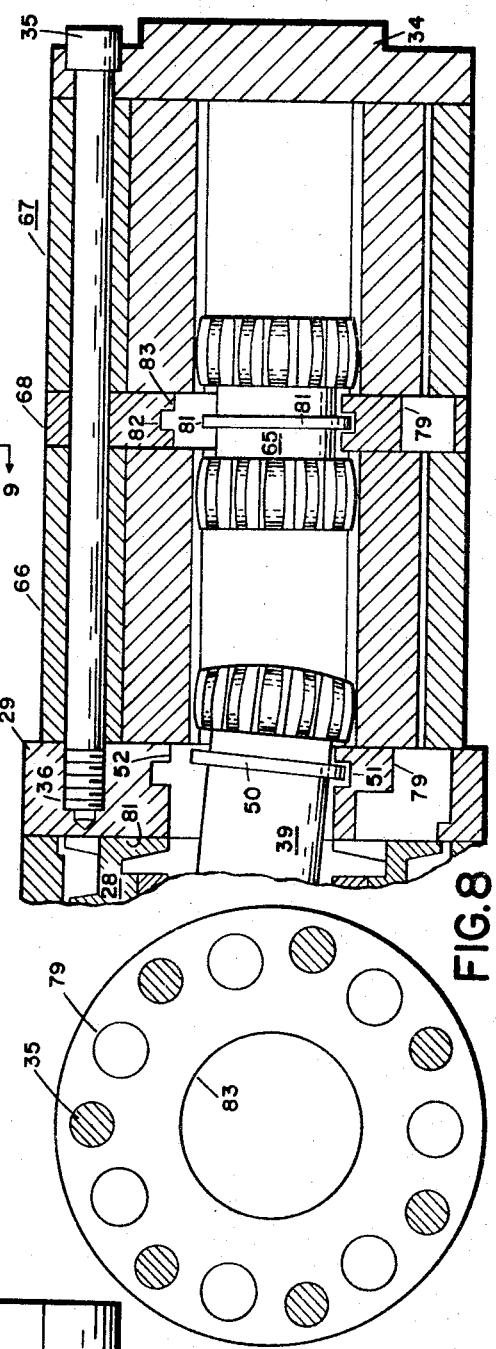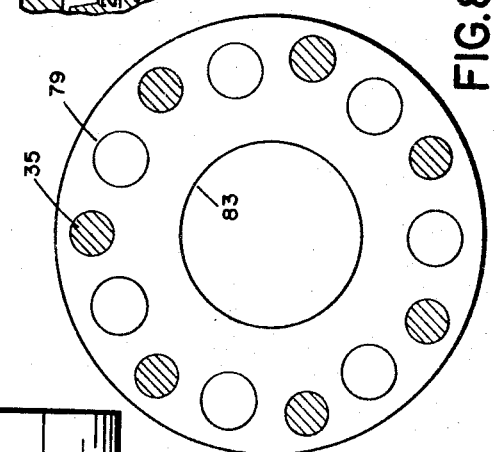

United States Patent Office 3,549,282
Patented Dec. 22, 1970

3,549,282
FLUID PRESSURE DEVICE HAVING PLURALITY OF SETS OF STATOR-ROTOR MECHANISMS
George V. Woodling, 22077 W. Lake Road, Rocky River, Ohio 44116
Filed Feb. 18, 1969, Ser. No. 800,125
Int. Cl. F01c 1/10
U.S. Cl. 418—60      6 Claims

ABSTRACT OF THE DISCLOSURE

Fluid pressure device having plurality of sets of stator-rotor mechanisms with each set including stator and rotor means having intermeshing teeth defining operating fluid chambers. The stator means has substantially a fixed axis and the rotor means has a movable axis disposed for orbital movement about the fixed axis and for rotational movement about its own axis. Division means separate the respective sets. Connection means are provided for holding the sets and the division means together in a side-by-side stacked relationship with the moveable axes of the rotor means in substantially axial alignment with each other, whereby operating fluid chambers of substantially instant like capacities are disposed in substantially straight longitudinal alignment with each other. The division means has fluid passage means extending therethrough and repsectively connect the aligned operating fluid chambers together. Valve system means controls the entrance of fluid to and the exit of fluid from the connected operating fluid chambers.

BACKGROUND OF THE INVENTION

In a stator-rotor mechanism having stator and rotor means, it has been found that the round outer tips of the teeth of the rotor means, where they make slidable contact with the internal teeth of the stator means, tend to wear away relatively fast, thereby causing fluid leakage and the accompanying loss of torque. This is especially true where excessively high pressures are employed to develop the necessary torque. If lower pressure is used in an attempt to cure the wear problem, then there is usually insufficient torque to do the required job.

Stator-rotor mechanisms, which are available on the market, are constructed of varying widths, ranging from one-quarter (¼) inch to two (2) inches. For the narrower width of stator-rotor mechanisms, if more torque is needed, then it is only necessary to use a stator-rotor mechanism of greater width. However, the real torque problem usually does not occur when narrow stator-rotor mechanisms are used. The main torque problem arises in those cases where stator-rotor mechanisms of maximum width (two inches) are used. In this situation, the only recourse is to use higher fluid pressures because wider stator-rotor mechanisms are not commercially available. But as pointed out above, it is these higher pressures which cause the excessive wear.

Accordingly, it is an object of my invention to increase the life of stator-rotor mechanisms by stacking two or more sets of stator-rotor mechanisms on the end of a fluid pressure device and using lower fluid pressures.

Another object is to operatively intecnnect a plurality of stator-rotor mechanisms and use lower fluid pressure to prolong the life.

Another object is to interconnect the rotor means of the plurality of sets of stator-rotor mechanisms by an auxiliary shaft having male spline teeth interfittingly engaging female spline teeth in the rotor means and to limit the extent that relative axial movement may occur between the mating teeth.

SUMMARY OF THE INVENTION

The invention constitutes a fluid pressure device having a plurality of sets of stator-rotor mechanisms with each set comprising stator and rotor means, said stator means having substantially a fixed axis and ($n$) number of internal teeth, said rotor means having a movable axis disposed for orbital movement about said fixed axis and having ($n-1$) number of external teeth intermeshing with said internal teeth of said stator means, said rotor means being also disposed for rotational movement about its own axis, whereby said rotor means has a combined rotor movement comprising said orbital and rotational movements, said intermeshing teeth upon relative movement therebetween defining operating fluid chambers, division means separating said sets, connection means joining said division means and said sets of stator-rotor mechanisms together in a side-by-side stacked relationship with said movable axes of said rotor means being in substantially axial alignment with each other, whereby operating fluid chambers of substantially instant like capacities are disposed substantially in straight longitudinal alignment with each other, said division means having fluid passage means extending therethrough and respectively connecting said aligned operating fluid chambers together, and valve system means for controlling the entrance of fluid to and the exit of fluid from said connecting operating fluid chambers.

Other objects and a fuller understanding of this invention may be had by referring to the following description and claims, taken in conjunction with the accompanying drawings, in which:

FIG. 7 is an external top view of a fluid pressure device having at least two stacked stator-rotor mechanisms mounted on the end thereof;

FIG. 8 is a partial cross-sectional view of a fluid pressure device in FIG. 7, showing an auxiliary shaft interconnecting the two rotor means of the stacked set; and FIG. 9 is a side view of a division plate separating the two sets of stator-rotor mechanism.

DESCRIPTION OF THE PREFERRED EMBODIMENT

Figure 1:
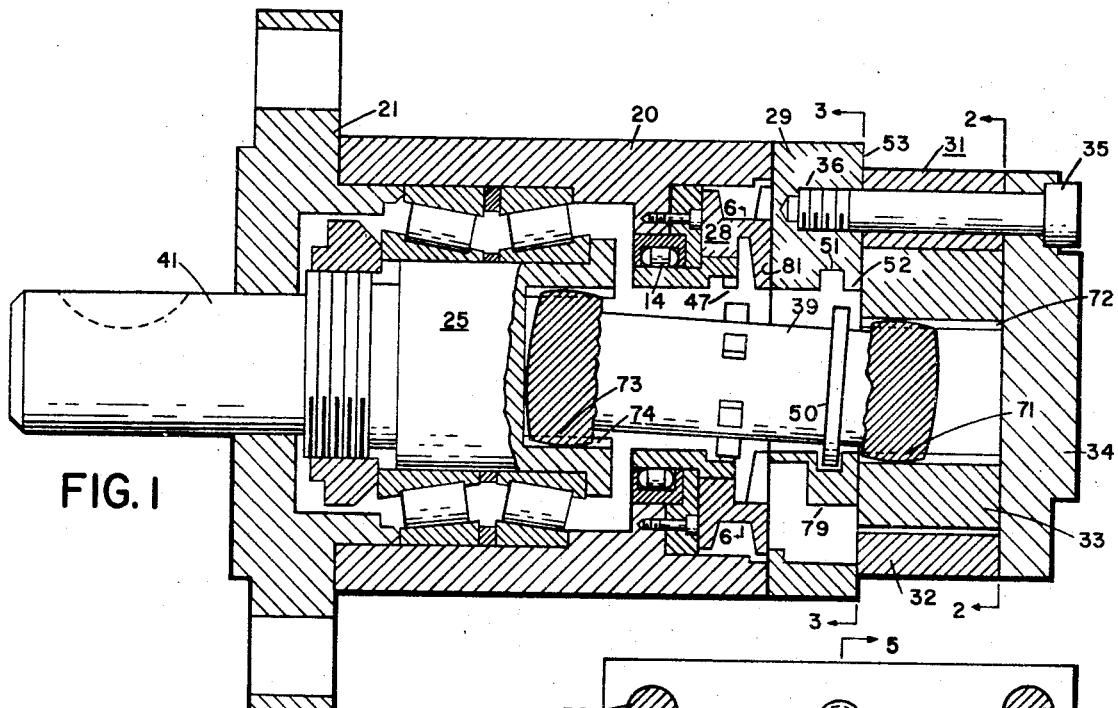
FIG. 1 is an elongated view, partly in section, of an orbital fluid pressure device to which my invention may be applied.

The figures of the drawing show a preferred embodiment of the invention but this is only by way of illustration; it is not to be taken as limiting, the invention being limited only by the hereinafter appended claims.

In this application, the terms "stator" and "rotor" are not used in a limited sense. The term "stator" is applied to the element which has a fixed axis and the term "rotor" is applied to the element which has a movable axis characterized in that said rotor is disposed for rotational movement about its own movable axis and for orbital movement about the fixed axis of the stator. Thus, in this application, the outer surrounding element, usually referred to as the stator, may be either the stator or rotor, depending upon whether it has a fixed axis or a movable axis, and the inner element, usually referred to as the rotor, may be either the rotor or the stator depending upon whether it has a movable axis or a fixed axis.

For clarity of the invention, the usual shaft and static fluid seals are not shown. Also, all wear parts are made of hardenable or bearing metal and are well lubricated by the operating fluid.

With reference to the drawings, the construction of my orbital fluid pressure device may be generally the same as that shown in my application, Ser. No. 797,223, filed Feb. 6, 1969 and the disclosure thereof may be considered as being incorporated in this application. The construction of my orbital fluid pressure device comprises generally a main housing 20 having substantially a square cross-section. A mounting flange 21 is secured to the left-hand end of the housing. The housing 20 is hollow from end-to-end. Rotatively mounted in the left-hand end portion of the housing is a main shaft 25 having an axis substantially coinciding with the fixed axis. As illustrated, the main shaft 25 is rotatively mounted in tapered roller bearings. An external shaft 41 comprises an integral part of the main shaft 25. A rotary valve 28, rotatively mounted on bearings 14, is mounted in the right hand end portion of the main housing and sealingly engages a stationary face 81 of a stationary valve member 29 connected to the right hand end face of the main housing by screws 30. Attached to the right-hand face 53 of the stationary valve member 29, is a stator-rotor mechanism 31 comprising stator means 32 and rotor means 33. An end cap 34 encloses the stator-rotor mechanism. As illustrated, screws 35 secure the stator-rotor mechanism and the end cap 34 to the stationary valve member 29. The screws 35 threadably engage threaded holes 36 in the stationary valve member. Although not limited thereto, the stator has seven internal teeth and the rotor has six external teeth intermeshing with the stator internal teeth. The stator may be described as having ($n$) number of internal teeth and the rotor may be described as having ($n-1$) number of external teeth. The intermeshing teeth upon relative movement therebetween define operating fluid chambers. The rotor has an axis 70 which orbits about the fixed axis 69 of the stator. The rotor 33 also rotates about its own axis. The stator internal teeth constitute outer wall means of the operating fluid chambers. The rotor external teeth constitute inner wall means of the operating fluid chambers. The rotation of the rotary valve 28 relative to the stationary valve 29 controls the entrance of fluid to and the exit of fluid from the operating fluid chambers through fluid passages 79 in the stationary valve member 29. The rotary valve 28 is driven by a wobble or orbital shaft 39 which also interconnects the main shaft 25 and the rotor 33. As shown in FIG. 1, the right hand end portion of the wobble shaft 39 extends through a shaft hole 52 in the stationary valve member 29 and has an operative connection with the rotor 33. The shaft hole 52 has a reference axis substantially in axial alignment with the fixed axis of the stator. Thus, the axis of the wobble shaft 39 orbits around the reference axis, the same as the rotor axis orbits around the stator axis. The operative connection comprises male spline teeth 71 on the wobble shaft which interfittingly engage female spline teeth 72 in the rotor. Thus, the right-hand end portion of the wobble shaft 39 is disposed for rotational movement about its own axis and for orbital movement about the fixed axis of the stator. The connection means between the left-hand end portion of the wobble shaft and the main shaft 25 comprises male spline teeth 73 on the wobble shaft which interfittingly engage female spline teeth 74 in the central core of the main shaft. Thus, the left-hand end portion of the wobble shaft is disposed for rotational movement only about the fixed axis of the stator.

Figures 5, 6:
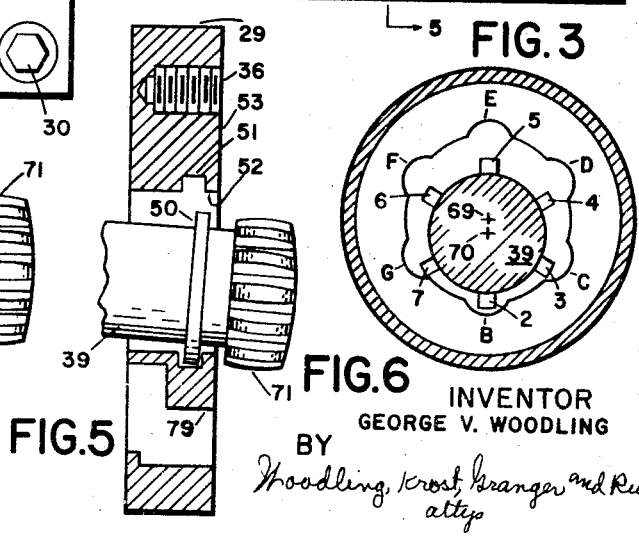
FIG. 5 is a cross-sectional view, taken along the line 5—5 of FIG. 3.
FIG. 6 is a view looking at the side of the valve drive means in FIG. 1, taken along the line 6—6 thereof.

The wobble shaft 39 is connected to drive the rotary valve 28 through one rotation for each rotation of the wobble shaft. The drive is shown in FIG. 6 and may be substantially the same as that shown and described in FIGS. 16–18 in my pending application, Ser. No. 797,223, filed Feb. 6, 1969. The drive means comprises a plurality of drive follower means B to G disposed at circumferentially spaced regional locations internally of the rotary valve and a plurality of drive actuating means 2 to 7 circumferentially disposed about the orbital shaft 39. The drive follower means B to G are circumferentially disposed with reference to the first axis about which the rotary valve rotates and the drive actuating means 2 to 7 are circumferentially disposed with reference to the shaft (second) axis. The drive follower means B to G comprise female wall means in the form of substantially a semi-circle provided in an internal rim 47 within the rotary valve. The drive actuating means 2 to 7 comprise male wall means in the form of lugs provided on the outside of the actuating shaft. The diameter of the top of the lugs may be substantially the same as the diameter of the male gear teeth 71 and 73, whereby the lugs as well as the male gear teeth may pass through the central opening in the stationary valve and in the rotary valve. The female wall means and the male wall means are preferably six in number, being the same in number as the external teeth of the rotor 33 and may be designated as ($n-1$) in number. The female wall means are circumferentially spaced apart from each other at substantially equal intervals (sixty degrees) about the first axis and the male wall means are circumferentially spaced apart from each other at substantially equal intervals (sixty degrees) about the shaft (second) axis. The drive actuating means 2 to 7 (male wall means) and the drive follower means B to G (female wall means) respectively engage each other in successive order at the regional locations with the respective drive means at each regional location constituting a pair of regional drive means for transmitting a torque therebetween in response to the combined movement of the orbital shaft 39.

The drive means thus described constitutes universal drive means and provides for rotating the rotary valve means relative to the stationary valve means once for each rotation of the wobble shaft 39. The operation of the rotary valve means is independent of the load and thrust on the main shaft. The fluid may flow through the drive means as open spaces are needed to accommodate for the flow of fluid therethrough.

Figure 4:
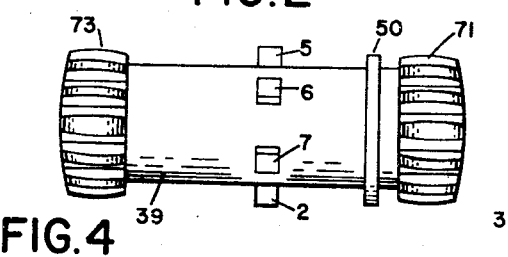
FIG. 4 is a side view of the wobble shaft with male spline teeth on the ends thereof.

Relative axial movement may occur between the male and female spline teeth connections, and in this invention, confinement or axial limit means are provided to limit such relative axial movement. In FIGS. 4 and 5, the confinement means comprises abutment means in the form of an annular shoulder 50 on the wobble shaft 39 which is disposed to orbitaly fit within an annular recess 51 provided inside of a centrally disposed shaft hole 52 in the stationary valve member 29, see FIG. 5. The interengagement between the side walls of the shoulder 50 and the side walls of the recess 51 limits the relative axial movement between the male and female spline teeth.

The orbital shaft 39 may be inserted in the hole 52 of the rotary valve 29 in the normal manner without any obstruction from the annular shoulder 50, since its outside diameter is less than the diameter of the hole 52. It is the orbital position of the rotor means 33 which holds the annular shoulder 50 within the recess 51. There is always at least some portion of the annular shoulder 50 engaging a side wall of the recess 51. This interengagement of the side walls limits the extent that the orbital shaft may move in an axial direction and makes it possible to interchange stator-rotor mechanism of variable width. Thus, if it were not for my axial limit means, it would be possible for the orbital shaft 39 to work its way to the right in FIG. 1 until it hit the end cap 34, thereby causing the male and female spline teeth 73 and 74 to lose their full engagement width for transmitting full torque to the main shaft 25.

FIGS. 7, 8 and 9 show two sets of stator-rotor mechanism connected to the end of the fluid pressure device. The two sets are connected together by an auxiliary shaft identified by the reference character 65 and the stacked stator-rotor mechanism are identified by the reference characters 66 and 67 and are secured to the stationary valve member 29 by elongated screws 35. A division plate 68 separates the two sets and is provided with fluid passages 79 which match the position of the fluid passages 79 in the stationary valve member 29. Thus, the fluid chambers formed in both of the sets of stator-rotor mechanism are connected together and are controlled by the rotary valve 28. As illustrated, the auxiliary shaft 65 is provided with an annular shoulder 81 which orbitally fits into an annular recess 82 in the centrally disposed shaft hole 83 in the division plate 68. The male spline teeth on the ends of the auxiliary shaft 65 are therefore prevented from moving axially relative to the female spline teeth in the rotor sets.

The power developed is a function of the width of the stator-rotor mechanisms which are available on the market in varying widths, ranging from one-quarter (¼) inch to two (2) inches. In FIGS. 7 and 8, the width of the stator-rotor mechanisms 66 and 67 are shown to be two inches. Considerable power can be developed by these two wide sets and, in case all the power is not needed, the fluid pressure may be greatly reduced, resulting in longer life for the two rotor sets, than if more power were tried to be developed by one set with increased pressure. The second set 67 may run free from the first set 66, in which case there would be no auxiliary shaft. A free running set would have the effect of reducing the speed, all other factors remaining the same. A reduction in speed would prolong the life of the stator-rotor mechanism. The free running second set 67 would rotate in synchronism with the first set.

Figure 2:
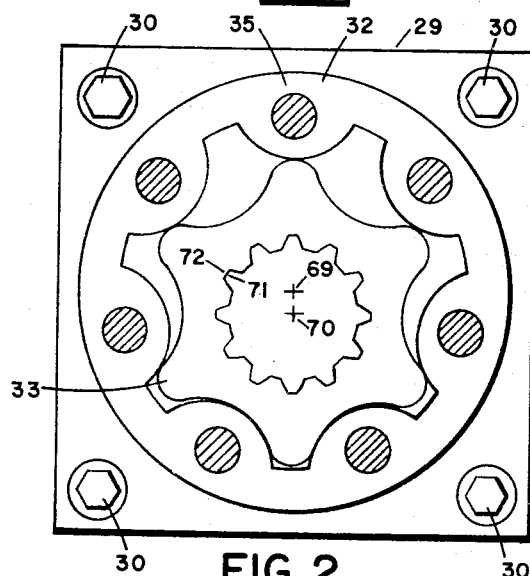
FIG. 2 is a view taken along the line 2—2 of FIG. 1 under the end cap, showing the stator-rotor mechanism.
Figure 3:
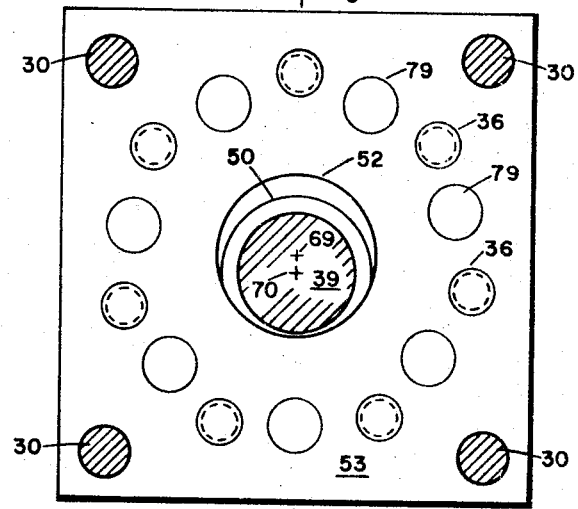
FIG. 3 is a view taken along the line 3—3 of FIG. 1, showing the stator-rotor side of a stationary valve member, the wobble or actuating shaft being shown in section.

The elongated screws 35 hold the tow sets together, with the division plate 68 therebetween, in a side-by-side stacked relationship with the movable axes of the rotor means operated in substantially axial alignment with each other, whereby operating fluid chambers of substantialy instant like capacities are disposed in substantialy straight longitudinal alignment with each other. The fluid passages 79 in the division plate 68 respectively connect the aligned operating fluid chambers. The expression, "instant like capacities," as used herein, means the cross-sectional flow areas at any given instant of the aligned operating fluid chambers, as viewed in a profile plane; such, for example, as shown in FIG. 2, and is independent of the respective length-wise dimensions of the sets of stator-rotor mechanism.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A fluid pressure device having a plurality of sets of stator-rotor mechanisms with each set comprising stator and rotor means, said stator means having substantially a fixed axis and ($n$) number of internal teeth, said rotor means having a movable axis disposed for orbital movement about said fixed axis and having ($n-1$) number of external teeth intermeshing with said internal teeth of said stator means, said rotor means being also disposed for rotational movement about its own axis, whereby said rotor means has a combined rotor movement comprising said orbital and rotational movements, said intermeshing teeth upon relative movement therebetween defining operating fluid chambers, division means separating said sets, connection means joining said division means and said sets of stator-rotor mechanisms together in a side-by-side stacked relationship with said movable axes of said rotor means being in substantially axial alignment with each other, whereby operating fluid chambers of substantially instant like capacities are disposed substantially in straight longitudinal alignment with each other, said division means having fluid passage means extending therethrough and respectively connecting said aligned operating fluid chambers together, and valve system means for controlling the entrance of fluid to and the exit of fluid from said connected operating fluid chambers.

2. The structure of claim 1, wherein said valve system means includes stationary valve means having fluid openings communicating respectively with said connected operating fluid chambers.

3. The structure of claim 2, wherein said fluid passage means in said division means and said fluid openings in said stationary valve means are respectively in substantially straight longitudinal alignment with each other.

4. The structure of claim 1, wherein said plurality of sets of stator-rotor mechanism comprises at least first and second sets and wherein said division means comprises at least a division member disposed between said first and second sets of stator-rotor mechanism, said first and second sets respectively having first and second rotor means, said division member having internal wall means defining a centrally disposed shaft opening, shaft means extending through said shaft opening and interconnecting said first and second rotor means, said first and second rotor means respectively having first and second female spline teeth, said shaft means having first and second male spline teeth respectively engaging said first and second female spline teeth, said shaft means and said division member having interengagement means to limit relative movement respectively between said first male and female spline teeth and said second male and female spline teeth.

5. The structure of claim 4, wherein said division member has abutment wall means extending outwardly from said shaft opening and wherein said shaft means has abutment means extending outwardly therefrom and engageable with said outwardly extending abutment wall means to limit relative axial movement respectively between said first male and female spline teeth and said second male and female spline teeth.

6. The structure of claim 5, wherein said division member has inner annular recess means with opposing abutment wall means extending outwardly from said shaft opening, and wherein said abutment means on said shaft means is engageable with at least one of said opposed abutment wall means.

References Cited

UNITED STATES PATENTS

| | | | |
|---|---|---|---|
| 2,821,171 | 1/1958 | Charlson | 91—56 |
| 3,270,682 | 9/1966 | Charlson | 103—130 |
| 3,289,542 | 12/1966 | Fikse | 103—130X |
| 3,309,999 | 3/1967 | Patterson | 103—130 |
| 3,405,603 | 10/1968 | Woodling | 103—130X |
| 3,452,543 | 7/1969 | Goff et al. | 91—56X |

EVERETTE A. POWELL, JR., Primary Examiner